J. BAMFORD.
POTATO DIGGING MACHINE.
APPLICATION FILED OCT. 18, 1909.

1,020,247.

Patented Mar. 12, 1912.
5 SHEETS—SHEET 5.

Witnesses

Inventor
Joseph Bamford

UNITED STATES PATENT OFFICE.

JOSEPH BAMFORD, OF UTTOXETER, ENGLAND.

POTATO-DIGGING MACHINE.

1,020,247.      Specification of Letters Patent.      Patented Mar. 12, 1912.

Application filed October 18, 1909. Serial No. 523,200.

*To all whom it may concern:*

Be it known that I, JOSEPH BAMFORD, a subject of the King of Great Britain, residing at St. Mary's Mount, Uttoxeter, Staffordshire, England, have invented new and useful Improvements in Potato - Digging Machines, of which the following is a specification.

My invention relates to potato digging machines of the kind wherein a series of vertically hanging tines, forks or the like, is revolved and carried by a disk or disks around a common axis and it comprises a novel arrangement of mechanism for controlling the action of the tines or forks, the latter being operated by cranks or epicyclic gearing; the said tines or forks are arranged on the outside of, or the ends of, the controlling mechanism, on either side or both sides, of the said disk or disks and are furthermore arranged in combination with a share or shares for digging under the potatoes. I may, when desirable arrange the tines or forks and shares to operate in either direction by the use of suitable reversing gear and the tines or forks may be carried on the ends of their controlling mechanism either in a direct line with their ends or spread out conewise therefrom. The mechanism is carried upon a frame arranged upon the axle which carries the road wheels and is driven by the latter.

To enable the invention to be fully understood I will describe the same by reference to the accompanying drawing, in which:—

Figure 1:
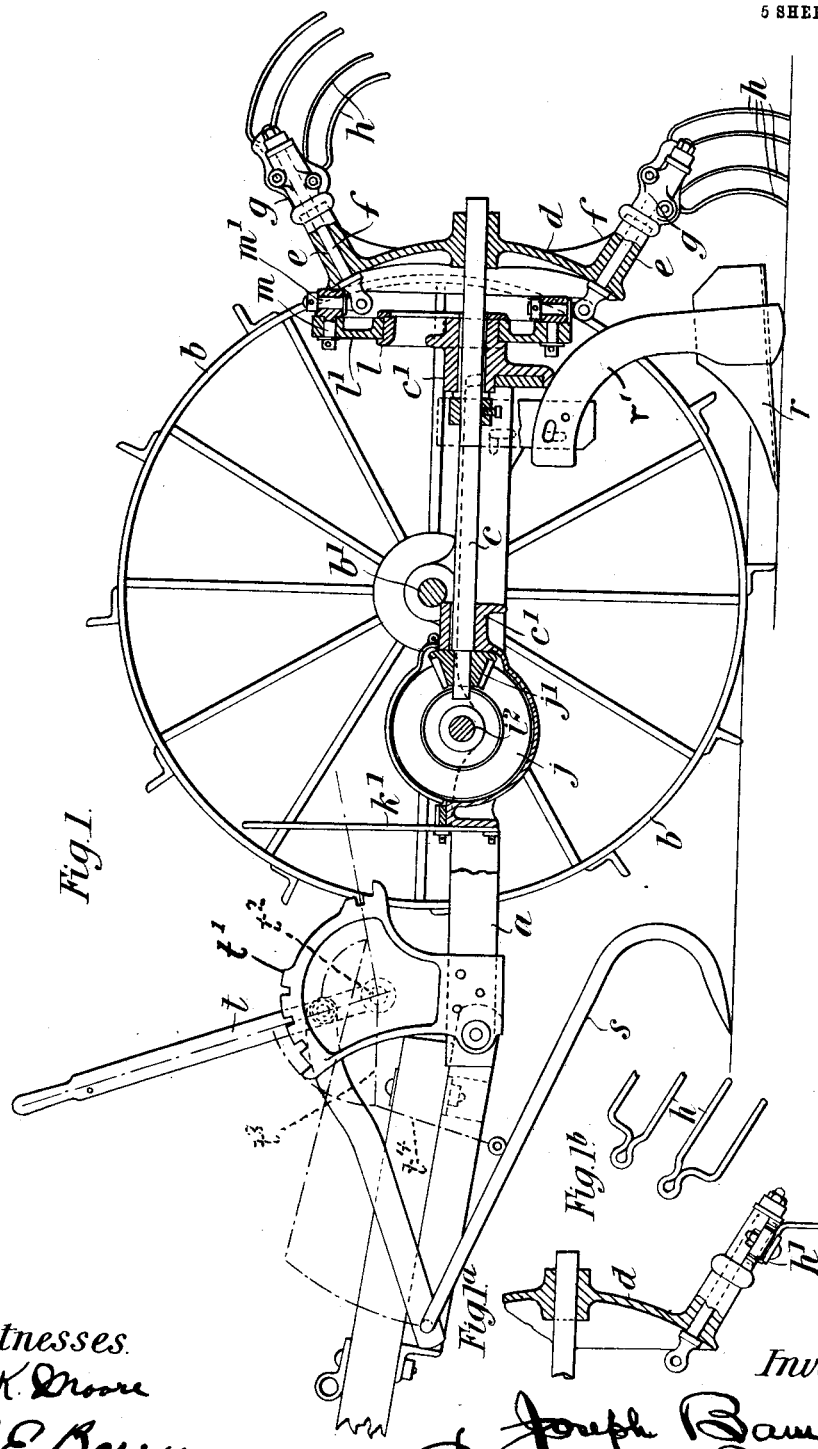
Figure 2:
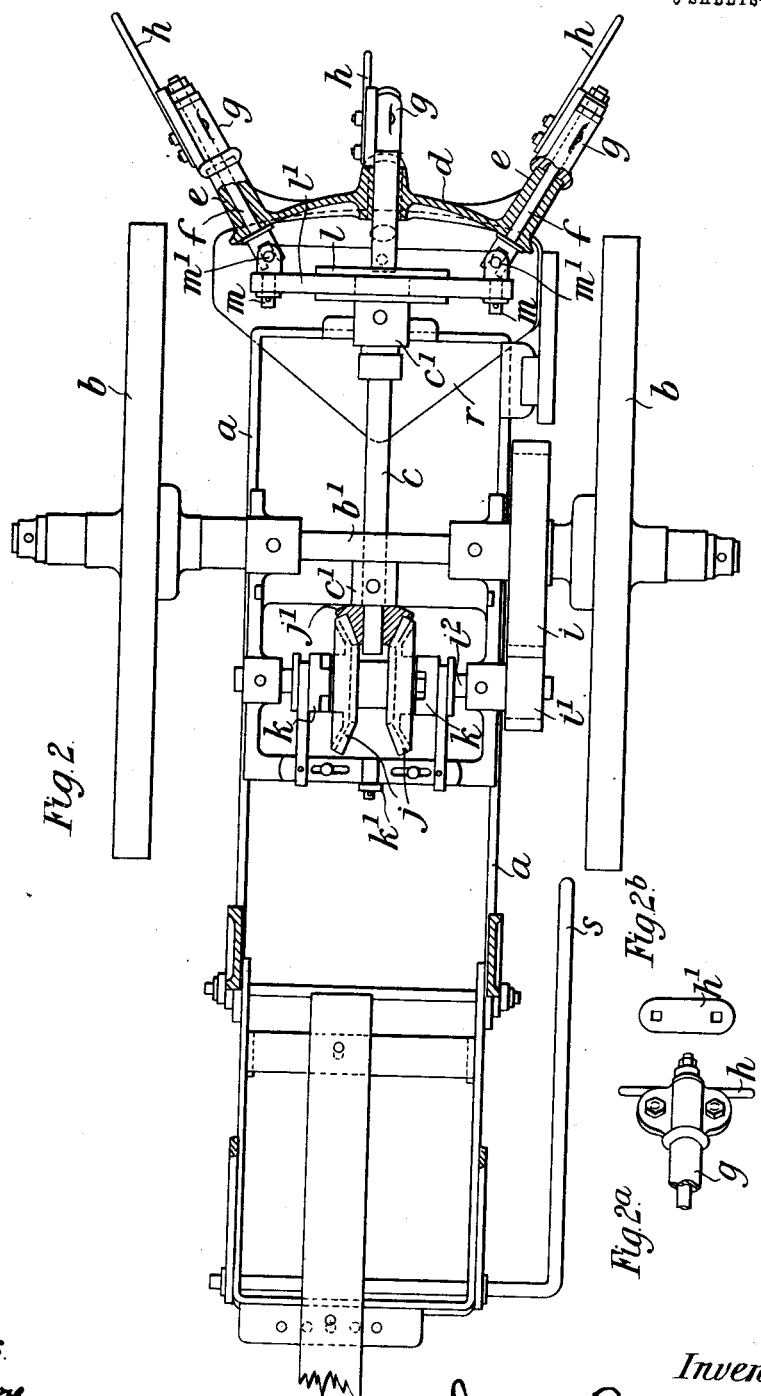
Figure 3:
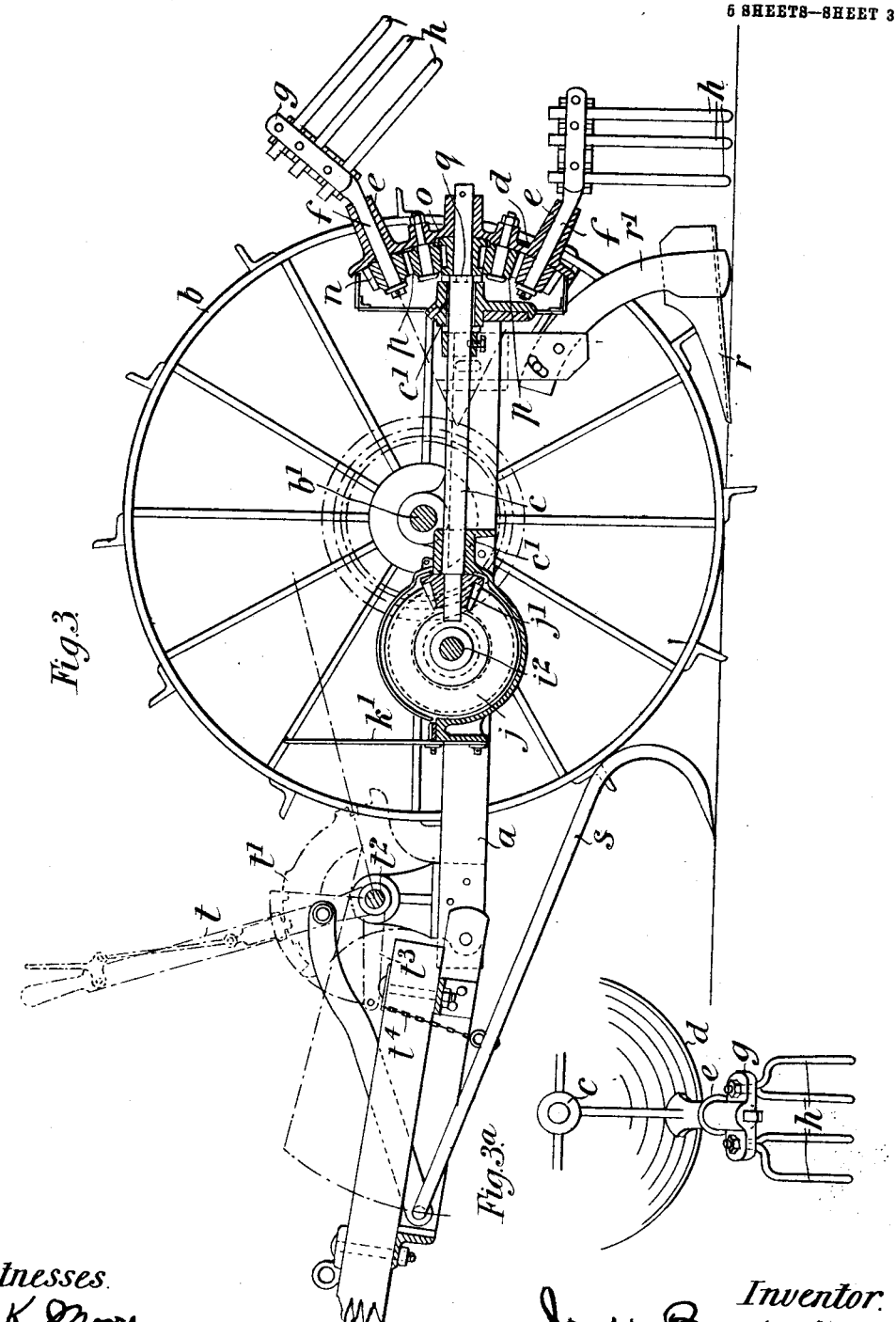
Figure 4:
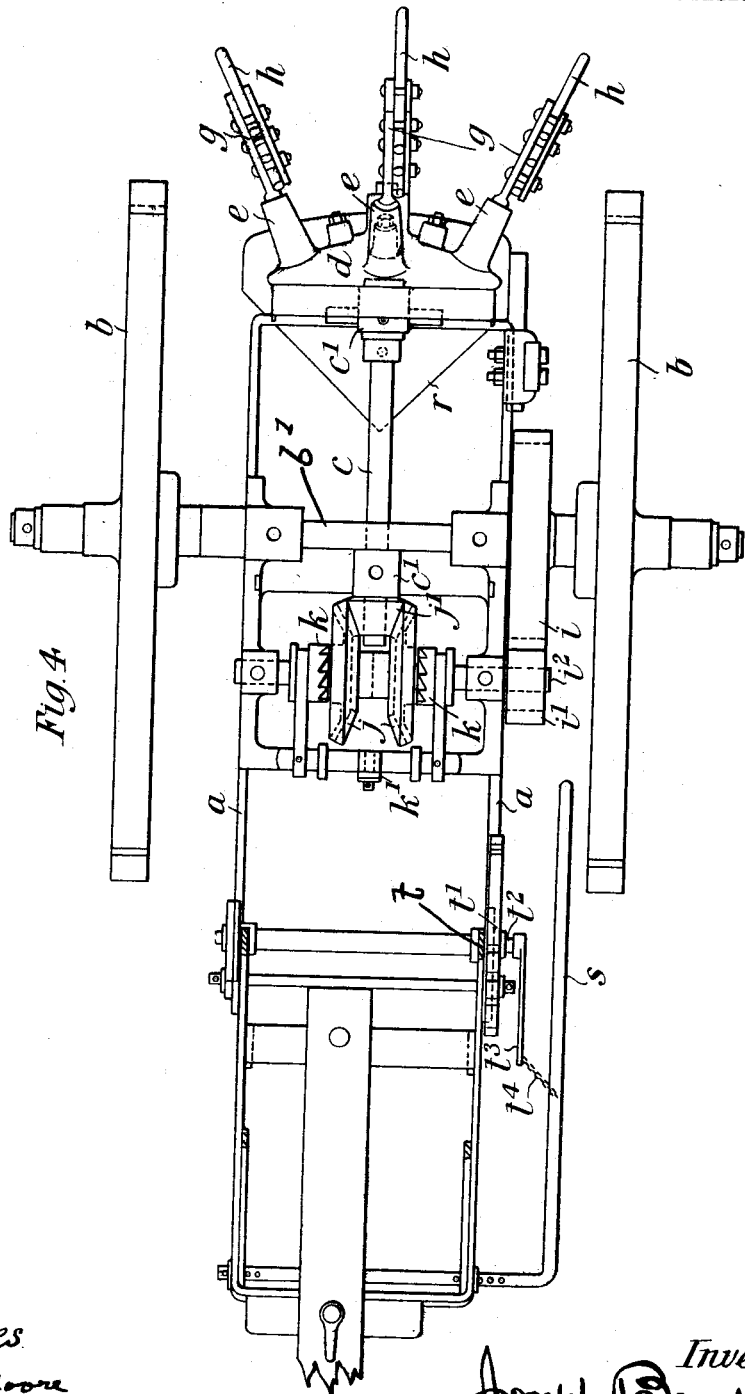
Figure 5:
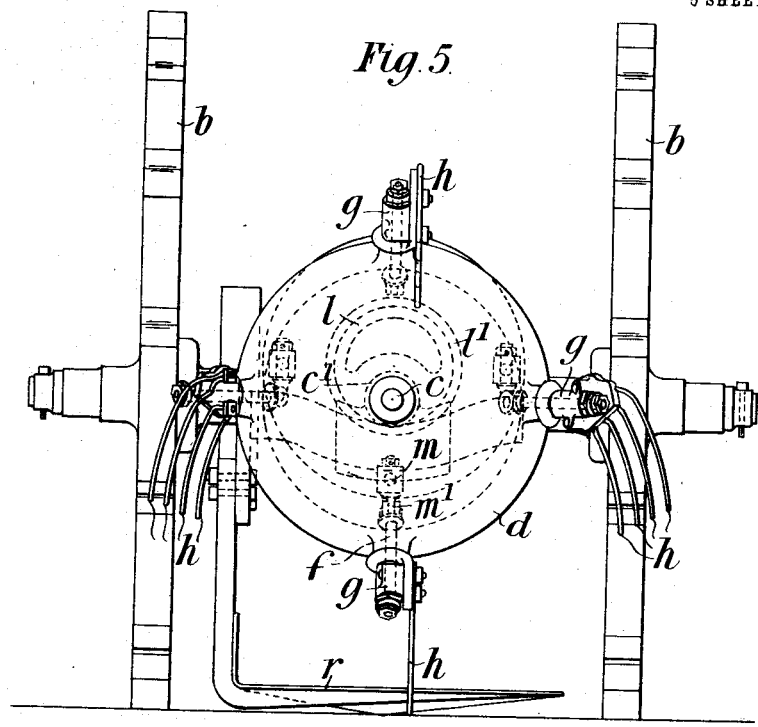
Figure 6:
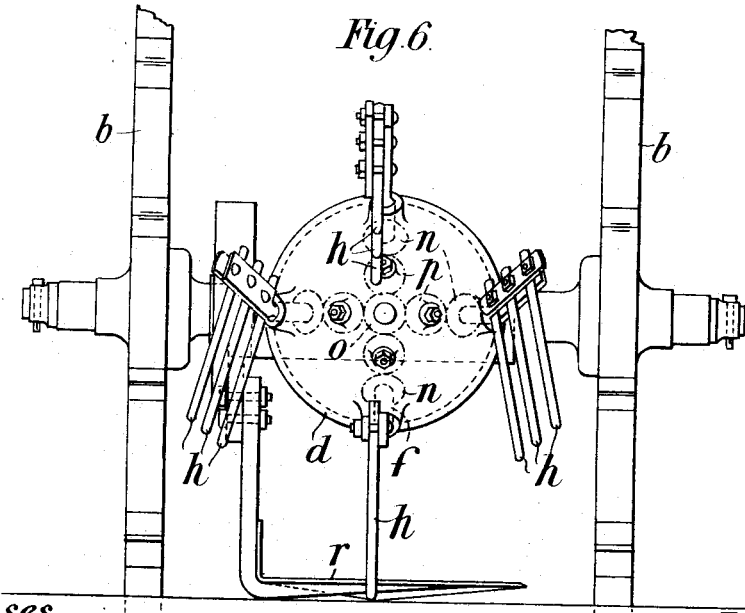

Figure 1 is a sectional side elevation of a machine wherein the tines or forks are driven by cranks, and Fig. 1ª is a partial sectional view showing the tines arranged side by side and presenting their broad surfaces in the direction of the line of travel. Fig. 1ᵇ shows the tines of Fig. 1ª detached. Fig. 2 is a plan of the machine shown in Fig. 1. Fig. 2ª is a top view of the head shown in Fig. 1ª. Fig. 2ᵇ is a view of the plate for securing the tines. Figs. 3 and 4 are views similar to Figs. 1 and 2 respectively wherein the tines are driven by epicyclic gearing. Fig. 3ª is a detail view showing a modified form of device for securing the tines shown in Fig. 1ª. Fig. 5 is a rear elevation of the apparatus illustrated in Figs. 1 and 2. Fig. 6 is a rear elevation of the apparatus illustrated in Figs. 3 and 4.

Similar letters of reference indicate corresponding parts in the several figures.

$a$ indicates the frame of the machine, $b$, $b$ the traveling wheels mounted upon the axle $b'$ and $c$ the longitudinal shaft mounted in suitable bearings $c'$, $c'$ in the frame and having secured to its rear end the disk or wheel $d$ provided with a series of sockets or bearings $e$, $e$ in which the shanks or spindles $f$, $f$ carrying the heads $g$, $g$ to which the tines $h$, $h$ are fixed, are journaled, the said heads being arranged to form the outer or extended ends of the said shanks or spindles. As shown these heads are at the rear side of the carrying disk, but they may be arranged at the front thereof if desired. Also the said heads are arranged conewise, that is to say having their shanks diverging angularly from the axis of revolution, which arrangement enables the wheel carrying the tines to be made considerably smaller than when the wheel has the shanks arranged parallel to it so that more room is afforded between the bottom of the wheel and the top of the row of potatoes over which the implement is working. Motion can be transmitted to the longitudinal shaft $c$ through the driving wheels in any suitable manner; as shown in the drawings the axle $b'$ has mounted upon it a gear wheel $i$ which engages with a pinion $i'$ mounted on an intermediate shaft $i^2$ journaled in the framing. This intermediate shaft has loosely mounted upon it two bevel wheels $j$, $j$ which engage with a bevel pinion $j'$ on the longitudinal shaft, and these bevel wheels $j$, $j$ are arranged in conjunction with clutch boxes $k$, $k$ which rotate with the shaft and which can be operated, through the medium of a lever $k'$, to positively drive either of the bevel wheels $j$, $j$ according to the direction in which the shaft $c$ is to rotate, the wheel $j$ which is not positively driven by the shaft $i$ rotating in a direction opposite to that of the other wheel $j$ in the well-known manner.

In the arrangement of my invention shown in Figs. 1 and 2, wherein the tine heads $g$ are retained in a vertical position by means of cranks, I arrange in conjunction with the rear bracket $c'$ in which the shaft $c$ rotates a drum $l$ which is eccentric to the shaft $c$ and upon the periphery of which runs a ring $l'$. This ring $l'$ has mounted in it a series of cranks $m$ corresponding in number with the fork spindles $f$ each of the said cranks being formed with a knuckle joint $m'$ and being pivotally connected to one of the spindles $f$. It will be understood that this arrangement of eccentric ring and cranks relatively with the spindles $f$ in the disk or wheel $d$ will have the effect of maintaining the tines in a hanging position. As shown in Figs. 1 and 2 each head has clamped into it two tines $h, h$ one behind the other; if desired, however, the heads may be arranged as shown in Figs. $1^a$, $2^a$ and $3^a$ so that the tines will stand side by side and present their broad surfaces in the direction in which the machine is traveling. Fig. $1^b$ shows the tines detached and Fig. $2^b$ shows a plate $h'$ which serves for clamping the tines $h$ in position.

In the modification of my invention shown in Figs. 3 and 4 the general arrangement of the framing of the machine and of the gearing for driving the longitudinal shaft $c$ is the same. In this modification, however, wherein the tines are retained in the vertical position by means of epicyclic gearing, each of the spindles $f$ has mounted upon it a pinion $n$ which pinion in turn engages with a common fixed pinion $o$ through the medium of an intermediate idle pinion $p$. The pinion $o$ is fixed relatively with the shaft $c$ so that as the wheel $d$ is rotated the several pinions $p$ rolling around the fixed pinion $o$ will serve to transmit motion to the pinion $n$ in the well-known manner to retain the tines in a vertical position. In order to permit of fixing the pinion $o$ relatively with the shaft $c$ it is advantageously formed with clutch teeth $q$ which engage with corresponding teeth formed in the end of the bracket or bearing $c'$. $r$ is the usual blade which passes beneath the potatoes and which is carried by an adjustable arm $r'$ on the framing and $s$ is the tine which is advantageously arranged in the front part of the framing and which serves for breaking the ground in front of the leg $r'$ for reducing the strain upon the latter, the depth at which the said tine $s$ works being controlled by a hand-lever $t$, working over a notched quadrant or catch-plate $t'$ and connected to the tine $s$ through the medium of the shaft $t^2$, lever $t^3$, and chain $t^4$.

Having now particularly described and ascertained the nature of my said invention and in what manner the same is to be performed, I declare that what I claim is:—

1. In a potato digger, the combination with a main frame, of a rotatable part carried thereby, having its axis disposed parallel to the line of draft, a plurality of digging forks carried by said rotatable device having their shanks pivotally mounted therein and diverging angularly with respect to the axis of said rotatable part, means for driving said rotatable part, and mechanism operatively connected with said shanks for maintaining the forks in pendent position.

2. In a potato digger, the combination with a main frame, a rotatable part, and means for driving the same, of a plurality of rotatable shanks mounted in bearings in said rotatable part, and diverging angularly from the axis of rotation, and extending rearwardly from said rotatable part, digging forks secured to the rearward ends of said shanks, a rotatable controlling device, arranged on the forward side of said rotatable part, and connections from said controlling device to the forward ends of said diverging shanks for holding said shanks in a pendent position.

3. In a potato digger, the combination with a main frame, of a rotatable part carried thereby and means for driving said rotatable part, a plurality of digging forks each provided with a shank pivotally engaging said rotatable part, a pinion secured to each of said shanks and gearing operatively engaging said pinions for maintaining said forks in pendent position.

4. In a potato digger, the combination with a main frame, of a rotatable part carried thereby and means for driving said rotatable part, a plurality of digging forks each provided with a shank pivotally engaging said rotatable part, a pinion secured to each of said shanks, a stationary pinion secured to the main frame, and connecting gearing between the stationary pinion and the pinions on said shanks.

JOSEPH BAMFORD.

Witnesses:
JOHN E. BONSFIELD,
C. G. REDFERN.